US011405364B1

(12) United States Patent
Sorniotti et al.

(10) Patent No.: US 11,405,364 B1
(45) Date of Patent: Aug. 2, 2022

(54) PRIVACY-PRESERVING ENDORSEMENTS IN BLOCKCHAIN TRANSACTIONS

(71) Applicant: International Business Machines Corporation, Armonk, NY (US)

(72) Inventors: Alessandro Sorniotti, Zurich (CH); Elli Androulaki, Zürich (CH); Angelo De Caro, Zürich (CH); Yacov Manevich, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 17/191,985

(22) Filed: Mar. 4, 2021

(51) Int. Cl.
*H04L 9/00* (2022.01)
*H04L 9/40* (2022.01)
(Continued)

(52) U.S. Cl.
CPC ......... *H04L 63/0421* (2013.01); *G06Q 30/04* (2013.01); *H04L 9/3066* (2013.01);
(Continued)

(58) Field of Classification Search
CPC ....... H04L 9/3066; H04L 9/3242; H04L 9/50; H04L 2209/08; H04L 63/0421; G06Q 30/04
See application file for complete search history.

(56) References Cited

U.S. PATENT DOCUMENTS

| 10,341,121 B2 | 7/2019 | Androulaki et al. |
| 10,552,627 B2 | 2/2020 | Leporini et al. |

(Continued)

FOREIGN PATENT DOCUMENTS

| CN | 107040383 B | 1/2018 |
| CN | 108021821 A | 5/2018 |

(Continued)

OTHER PUBLICATIONS

Androulaki et al., "Endorsement in Hyperledger Fabric", 2019 IEEE International Conference on Blockchain (Blockchain), Jul. 14-17, 2019, pp. 510-519.

(Continued)

*Primary Examiner* — Minh Dinh
(74) *Attorney, Agent, or Firm* — Stosch Sabo (57) ABSTRACT

Described are techniques for privacy-preserving endorsements in blockchain transactions. The techniques include a method comprising associating a ledger key in a local collection with an ephemeral key, where the ephemeral key is a re-randomization of a key associated with a first organization. The method further comprises generating, by a first peer associated with the first organization, an anonymous endorsement of a transaction in a blockchain using the ephemeral key. The method further comprises determining, by a second peer associated with the first organization, that the first peer endorsed the transaction. The method further comprises retrieving, by the second peer, a preimage from the first peer. The method further comprises providing information including the anonymous endorsement and the transaction to a second organization associated with the blockchain, where the anonymous endorsement is anonymous to peers associated with the second organization.

20 Claims, 6 Drawing Sheets

(51) Int. Cl.
*H04L 9/30* (2006.01)
*G06Q 30/04* (2012.01)
*H04L 9/32* (2006.01)

(52) U.S. Cl.
CPC .............. *H04L 9/3242* (2013.01); *H04L 9/50* (2022.05); *H04L 2209/08* (2013.01)

(56) References Cited

U.S. PATENT DOCUMENTS

2020/0267002 A1* 8/2020 Yuan ..................... H04L 9/3239
2020/0322128 A1* 10/2020 Hu ........................ H04L 9/3218

FOREIGN PATENT DOCUMENTS

| CN | 109274501 A | 1/2019 |
| CN | 110189127 A | 8/2019 |
| CN | 110569668 A | 12/2019 |
| WO | 2019127278 A1 | 7/2019 |

OTHER PUBLICATIONS

Unknown, "Private data—Local collections", Fabric—FAB-7593, printed Oct. 21, 2020, 3 pages <https://jira.hyperledger.org/browse/FAB-7593>.

Nevile et al., "Enterprise Ethereum Alliance Client Specification v6", EEA Editor's Draft Oct. 15, 2020, 54 pages <https://entethalliance.github.io/client-spec/spec.html>.

Mell et al., "The NIST Definition of Cloud Computing", Recommendations of the National Institute of Standards and Technology, Sep. 2011, 7 pages.

\* cited by examiner

PRIVACY-PRESERVING ENDORSEMENTS IN BLOCKCHAIN TRANSACTIONS

BACKGROUND

The present disclosure relates to blockchains, and, more specifically, to privacy-preserving endorsements in blockchain transactions.

A blockchain can refer to a list of linked records (referred to as blocks), where each block can contain a cryptographic hash of a previous block, a timestamp, transaction data, and/or other data. A blockchain can be managed by a peer-to-peer network of nodes, and modifications to the blockchain can be endorsed and authenticated by self-interested collaboration between the peer-to-peer network of nodes.

SUMMARY

Aspects of the present disclosure are directed toward a computer-implemented method comprising associating a ledger key in a local collection with an ephemeral key, where the ephemeral key is a re-randomization of a key associated with a first organization. The method further comprises generating, by a first peer associated with the first organization, an anonymous endorsement of a transaction in a blockchain using the ephemeral key. The method further comprises determining, by a second peer associated with the first organization, that the first peer endorsed the transaction. The method further comprises retrieving, by the second peer, a preimage from the first peer. The method further comprises providing information including the anonymous endorsement and the transaction to a second organization associated with the blockchain, where the anonymous endorsement is anonymous to peers associated with the second organization.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward blockchains, and, more specifically, to privacy-preserving endorsements and private data collections in blockchains. While not limited to such applications, embodiments of the present disclosure may be better understood in light of the aforementioned context.

An explanation of terminology may be useful before discussing aspects of the present disclosure. Endorsements can refer to signatures from entities that certify the correctness of a transaction. Similarly, endorsers can refer to the entities that produce signatures over a transaction to certify its correctness. Collections can refer to private datastores, or datastores that store private data. In some situations, multiple collections (e.g., private datastores) can be "owned" by a subset of blockchain consortium members so that only that subset of blockchain consortium members has access to the private data.

While the terminology used in the present application may be associated with Hyperledger® Fabric, aspects of the present disclosure are applicable to any number of blockchain platforms or distributed ledger platforms. Accordingly, any reference to endorsers, endorsements, collections, keys, and the like in the present application should be interpreted as encompassing those features in the Hyperledger® Fabric and any equivalent or alternative functionality in any other blockchain platform or distributed ledger platform.

Current blockchain solutions lack robust mechanisms for hiding the identity of organizations involved in a transaction. Specifically, current blockchain solutions lack methods for hiding the identity of endorsers, collection names, and/or configuration settings. Leakage of endorsers is a serious issue in blockchain networks insofar as several blockchain networks require transactions to not leak any information. As one example, in a consortium where competing companies are members, the types of transactions and amounts of transactions that competing companies engage in should remain a secret. However, this requirement cannot be fully satisfied if the identity of the endorsers are known.

Existing solutions for privacy-preserving endorsements are inadequate for sufficiently hiding the identity of organizations involved in a transaction. For example, Hyperledger® Fabric channels can be used to hide transactions from consortium members who are not a member of the channel where the transaction is ordered. As is understood by one skilled in the art, a Hyperledger® Fabric channel is a private subnet of communication between two or more specific network members for the purposes of conducting private transactions. However, channels suffer from a variety of shortcomings such as, but not limited to, no clearly defined channel-to-channel interaction, inadequate scalability, ordering service leakage, and/or unrestricted disclosure of the entire past history for any member that joins the channel (e.g., there is no selective disclosure of channel history to new members).

Another inadequate solution for privacy-preserving endorsements involves using Identity Mixer (idemix) to hide the identity of the endorsers. Identity Mixer is a cryptographic protocol suite for privacy-preserving authentication and transfer of certified attributes which allows user authentication without divulging personal data. However, if collections are not employed, in such use cases, the transaction can still leak the contents of a read-write set (e.g., sensitive content of a transaction such as the data that was modified by that transaction and the values thereof) if collections are not used. Leakage of the read-write set can be at least as problematic as leaking endorser information. If collections are employed, the collection name can leak the distribution policy of the collection. The distribution policy (e.g., the members of the collection) is often identical to (or at least related to) the endorsement policy (e.g., the policy describing the set of required endorsers). Leakage stemming from the collection name thus defeats the purpose of hiding the identity of the endorsers. Another issue with using Identity Mixer is that knowledge of the dissemination policy cannot be trivially removed without significantly harming the functionality of Identity Mixer. In other words, a complete redesign would be required. A further issue with Identity Mixer relates to the performance and usability drawbacks incurred by a round of key distribution per new ephemeral key.

Another inadequate solution for privacy-preserving endorsements is to use local collections. Local collections can be used to remove configuration data leakage from regular collections by ensuring that preimage data is present only if generated by the peer at endorsement time. Disadvantageously, local collections are not suitable since they make preimage data available only to nodes that actually endorse a transaction, thereby leaving other nodes of the same organization out of sync. Since production ready consortia require several peers per organization, a client must contact all such peers using the local collections. Failure to do so creates state forks and it is impractical and expensive to require a client to contact all peers of all endorsing organizations before a transaction is submitted.

Another inadequate solution for privacy-preserving endorsements relates to Enterprise Ethereum Alliance® (EEA) private transactions which is a protocol allowing a transaction creator to specify who the transaction payload data is transmitted to and who is allowed to read it. Disadvantageously, this approach essentially collapses to the local collections approach and its limitations discussed above.

Another inadequate solution for privacy preserving endorsements relates to Corda®, where nodes can sync using any protocol or can resort to a notary to retrieve missing states. Disadvantageously, when the parties sync directly, they cause the same drawbacks as the local collections approach and its limitations discussed above. Furthermore, resorting to a notary to retrieve missing states introduces centralization and its associated drawbacks.

To address these and other deficiencies in the field of privacy-preserving endorsements for blockchain networks, aspects of the present disclosure are directed toward a privacy-preserving endorsement mechanism for blockchain networks consistent of one or more of the following three aspects: (i) proposal-driven private data dissemination, (ii) privacy-preserving endorsements, and/or (iii) detection of private data eligibility. Each of these aspects is discussed in more detail below.

Regarding item (i), proposal-driven private data dissemination can include disseminating private data (e.g., preimages) based on peer-initiated proposals rather than a fixed dissemination policy. In other words, a peer can know private data if it generated it during endorsement. The transaction creator (e.g., the client) can be responsible to propagate primage data to a sufficient number of peers to guarantee that all peers that should see the preimage did, in fact, see it. In most use cases, the dissemination policy and the endorsement policy can be identical. Therefore, collecting enough endorsements for a transaction can ensure that enough peers possess the preimage.

Proposal-driven private data dissemination can be used to generate preimages at a number of peers sufficient to realize persistence (e.g., enough peers storing the preimage to avoid data loss) and endorsement (e.g., enough peers endorsing the transaction to make it valid). This aspect of the present disclosure avoids the use of collections, thereby avoiding collection membership data leakage of the endorsers' identities.

One example implementation of the proposal-driven private data dissemination involves a built-in collection definition with distribution policy determined at runtime based on possession of a preimage. For example, if a peer has the preimage in a transient store, then the peer's organization should have the preimage (else it should not have the preimage).

Regarding item (ii), privacy-preserving endorsements can utilize an endorsement strategy that does not leak identity or organizational membership information. This is different from traditional endorsement techniques which can utilize x509 Membership Service Provider (MSP) keys, for example. Privacy-preserving endorsements can enable endorsements of transactions without revealing the identity of the endorsers. In some embodiments, endorsements can be made with cryptographic material that is unrelated to any organization (as opposed to using long-term, organization-specific keys) in order to further improve anonymity.

One example implementation of privacy-preserving endorsements involves Elliptic Curve Digital Signature Algorithm (ECDSA) re-randomization whereby an endorsement policy is defined by re-randomizing an organization's ledger key (e.g., the cryptographic key that is used to produce the signature which represents the endorsement) and encrypting the re-randomization factor under the organization's public key. The resulting public key and the encrypted factor can be listed as an endorsing identity in a blockchain transaction. Any peer associated with the same organization can endorse the transaction by decrypting the re-randomization factor and generating the signing key. Advantageously, no dissemination round is required, and the overhead is negligible (e.g., from a computational efficiency perspective, this aspect of the present disclosure can significantly outperform Identity Mixer).

Regarding item (iii), detection of private data eligibility provides a mechanism whereby a peer can detect that another peer of its organization endorsed a transaction (even if the endorsements do not reveal the identity of the endorser). This aspect of the present disclosure can be beneficial for enabling robust intra-organizational private data availability and dissemination. Same-organization endorsement detection can be used to disseminate preimages from endorsers to other peers associated with a same organization. In some embodiments, peers can learn whether a fellow peer associated with a same organization endorsed, and if so, they can request the preimage from the fellow peer.

One example implementation of detection of private data eligibility involves using a Hash-based Message Authentication Code (HMAC) tag by the endorsing peer. Whenever a peer endorses a transaction using a re-randomization key, it can add an HMAC tag that can be verified by other peers in the same organization. This can enable other peers from the same organization to detect when a first peer from the same organization endorsed a transaction while not disclosing this information to foreign peers (insofar as the HMAC key is known only to the peers of the same organization). The HMAC key can be derived from, for example, a key associated with the organization (e.g., an organization's ECDSA private key).

With one or more of the aforementioned three building blocks, aspects of the present disclosure can realize a blockchain network with one or more of the following characteristics (i) transactions do not leak the identity of the endorsers (e.g., by including a re-randomized key and encrypted re-randomization factor in the endorsement field of transactions and not utilizing collections), (ii) there is no significant per-transaction performance penalty to achieve endorsement privacy (e.g., no dissemination round, not all peers are required to endorse in order to retrieve associated private data), (iii) private data may be used without leaking information about the dissemination policy (peers from a same organization may request preimages from peers by using identifying data, such as, but not limited to, HMAC tags, associated with transactions), and/or (iv) intra-organization dissemination is feasible (e.g., using a built-in collection definition with distribution policy determined at runtime based on possession of a preimage).

Figure 1:
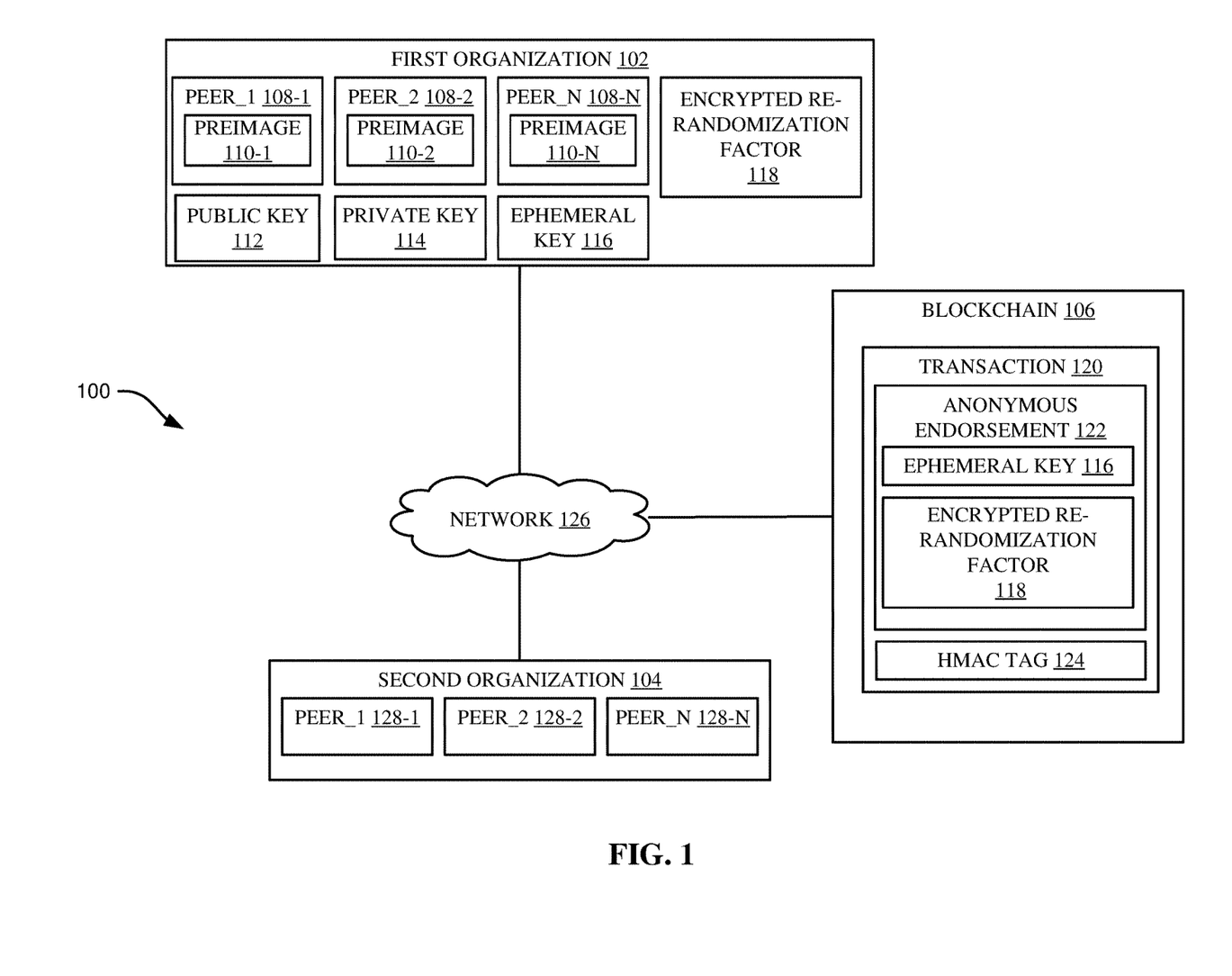
FIG. 1 illustrates a block diagram of an example computational environment, in accordance with some embodiments of the present disclosure.

Referring now to the figures, FIG. 1 illustrates a block diagram of an example computational environment 100, in accordance with some embodiments of the present disclosure. The computational environment 100 includes a first organization 102 communicatively coupled to a second organization 104 and a blockchain 106 via a network 126. The first organization 102 and the second organization 104 can refer to respective sets of computational resources that are dedicated to a respective business, government, non-profit, individual, or the like. The first organization 102 can be associated with a plurality of peers 108 such as peer 1 108-1, peer 2 108-2, and peer N 108-N, where N is any whole number. Each of the peers 108 can be a physical or virtual computational device such as, but not limited to, a server, a desktop, a laptop, a tablet, a handheld device, or any other computational device comprised of, or communicatively coupled to, processing resources, storage resources, and/or networking resources. Each of the peers 108 can include a preimage 110 such as a preimage 110-1 corresponding to peer 1 108-1, a preimage 110-2 corresponding to peer 2 108-2, and a preimage 110-N corresponding to peer N 108-N. For example, preimages 110 can be stored in transient data stores associated with each of the peers 108. In some embodiments, the preimages 110 are not identical, and peers 108 exchange preimages 110 to share private data.

Preimages 110 can contain private data. For example, preimages 110 can contain data related to aspects of blockchain 106 such as transactions, endorsements, ordering, and blocks. Preimages 110 can be defined with respect to a hash function H as x such that y=H(x).

Similar to the first organization 102, the second organization 104 can include multiple peers 128 such as peer 1 128-1, peer 2 128-2, and peer N 128-N. Although not shown for brevity, peers 128 can likewise store preimages. However, any preimages associated with the second organization 104 will be different from those preimages associated with the first organization 102 insofar as the private data contained in preimages can be shared within an organization (e.g., intra-organization) but not between organizations (e.g., inter-organization).

Referring back to the first organization 102, the first organization 102 can further include a public key 112, a private key 114, an ephemeral key 116, and an encrypted re-randomization factor 118. In some embodiments, the ephemeral key 116 is a re-randomized version of a key associated with the first organization 102 such as, but not limited to, a ledger key, the public key 112, and/or the private key 114. In some embodiments, the re-randomization is performed using a re-randomization factor. In some embodiments, the re-randomization is an Elliptical Curve Digital Signature Algorithm (ECDSA) re-randomization. Regardless of the type of re-randomization, the corresponding re-randomization factor can be encrypted to generate the encrypted re-randomization factor 118. The encrypted re-randomization factor 118 can comprise the re-randomization factor encrypted using the public key 112.

More generally, in some embodiments, an endorsement policy can be associated with a blockchain consortium, where the endorsement policy is associated with a ledger key and a re-randomized key (e.g., the ephemeral key 116) having a public component (e.g., public key 112) and a private component (e.g., private key 114).

Peers 108 of the first organization 102 and peers 128 of the second organization 104 can both support blockchain 106. However, as discussed above, it may be advantageous to have anonymously endorsed transactions 120 in the blockchain 106. For example, the first organization 102 and the second organization 104 may be business competitors that both support a mutually beneficial blockchain 106. In such an example, the first organization 102 and the second organization 104 may not want other organizations (or each other) to be capable of inferring information from endorsed transactions on the blockchain 106.

Blockchain 106 can include a transaction 120 that has an anonymous endorsement 122. In some embodiments, anonymous endorsement 122 lists the ephemeral key 116 and the encrypted re-randomization factor 118 as the endorsing entity. By doing so, any peer 108 of the first organization 102 can endorse the transaction 120 by decrypting the encrypted re-randomization factor 118 (e.g., by using the public key 112) and generating the signing key. Thus, no dissemination round of endorsements is required.

In some embodiments, when a peer 108 generates the anonymous endorsement 122 for the transaction 120, it can add an HMAC tag 124 that can be verified by other peers 108 associated with the first organization 102. Adding the HMAC tag 124 can enable other peers 108 associated with the first organization 102 to detect that a first peer (e.g., peer 1 108-1) endorsed a transaction. Beneficially, the HMAC tag 124 is not identifiable to peers 128 associated with the second organization 104. In some embodiments, the HMAC tag 124 is a distinct, independent HMAC tag 124 associated with the first organization 102. In some embodiments, the HMAC tag 124 is derived using the private key 114 of the first organization 102.

In response to detecting that a first peer 1 108-1 from the first organization 102 endorsed the transaction 120, the other peers 108 associated with the first organization 102 can retrieve the preimage 110-1 from the first peer 1 108-1.

Doing so can enable the other peers 108 to retrieve transaction data without requiring those peers to have endorsed the transaction 120.

Network 126 can be a permanent, semi-permanent, or intermittent network that continuously or intermittently connects two or more of the first organization 102, the second organization 104, and the blockchain 106. The network 126 can be a wide area network (WAN), local area network (LAN), personal area network (PAN), another type of network, or a combination of any two or more of the aforementioned networks. In some embodiments, the network 126 is the Internet or an intranet.

Although FIG. 1 illustrates two organizations and a single blockchain, this is purely for representative purposes. Embodiments can also include numerous additional organizations connected to a blockchain. Likewise, individual organizations can be associated with multiple blockchains where each blockchain can have a different set of participating organizations.

Figure 2:
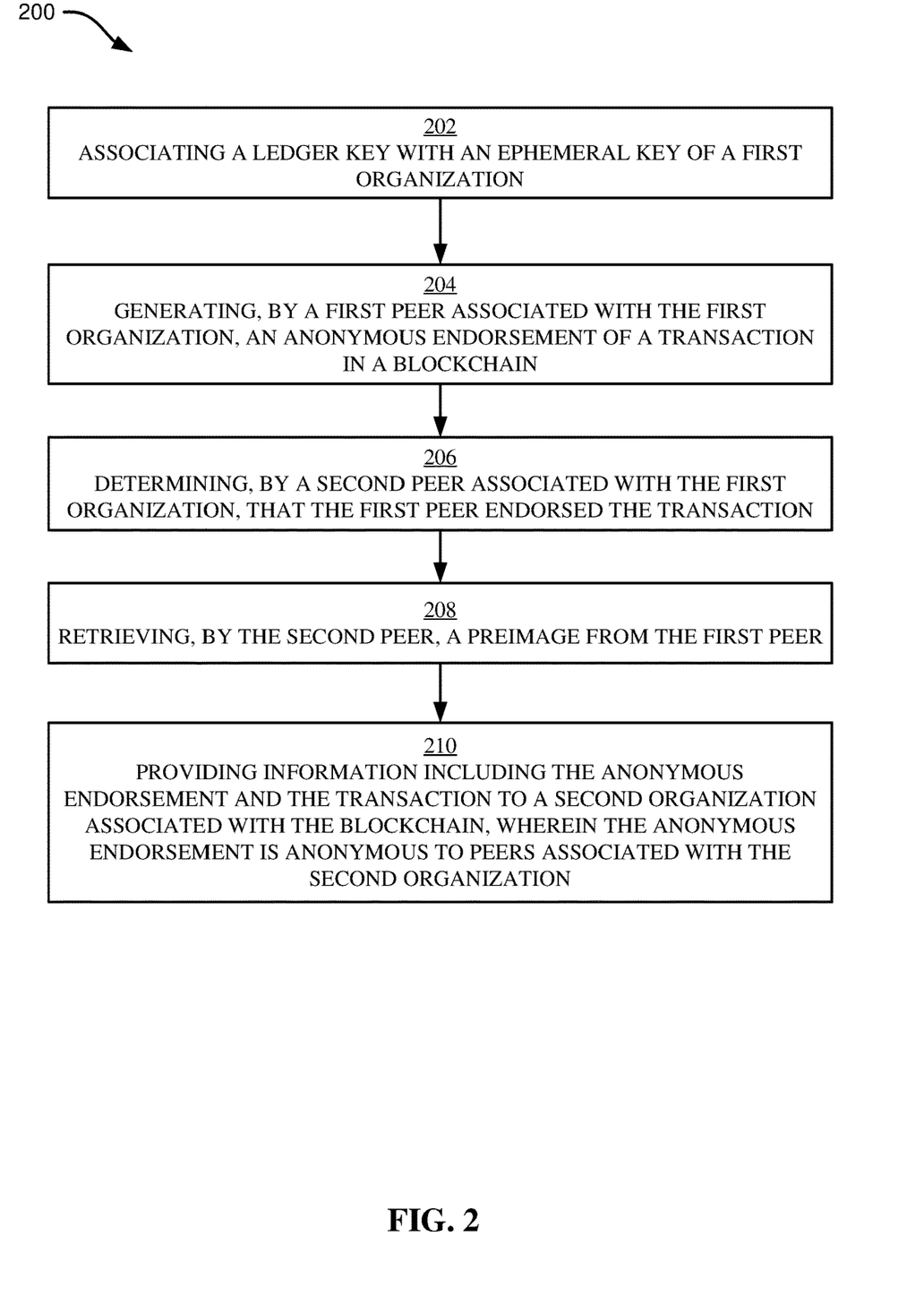
FIG. 2 illustrates a flowchart of an example method for anonymous endorsements in blockchain transactions, in accordance with some embodiments of the present disclosure.

FIG. 2 illustrates a flowchart of an example method 200 for anonymous endorsements in blockchain transactions, in accordance with some embodiments of the present disclosure. In some embodiments, the method 200 is implemented by a server, a computer, a processor, a virtual machine, one or more peers 108, or another configuration of hardware and/or software.

Operation 202 includes associating a ledger key with an ephemeral key 116 of a first organization 102. In some embodiments, the ledger key is a state variable, where the "state" is what the ledger stores. The ledger key can be associated with an endorsement policy, and the endorsement policy can be associated with the ephemeral key 116 (e.g., a rerandomized key) which has a public component (e.g., public key 112) and a private component (e.g., private key 114). In some embodiments, operation 202 further comprises defining a local collection that is a built-in collection definition with a distribution policy determined at runtime based on possession of a preimage.

Operation 204 includes generating, by a first peer 108-1 associated with the first organization 102, an anonymous endorsement 122 of a transaction 120 in a blockchain 106. In some embodiments, the anonymous endorsement 122 lists an ephemeral key 116 and an encrypted re-randomization factor 118 as the endorsing entity. In some embodiments, the anonymous endorsement includes a HMAC tag 124.

Operation 206 includes determining, by a second peer 108-2 associated with the first organization 102, that the first peer 108-1 endorsed the transaction 120. In some embodiments, the second peer 108-2 determines that the first peer 108-1 endorsed the transaction 120 based on the HMAC tag 124 associated with the transaction 120.

Operation 208 includes retrieving, by the second peer 108-2, a preimage 110-1 from the first peer 108-1 and storing the retrieved preimage in a data store of the second peer 108-2 (e.g., as a preimage 110-2). Operation 210 includes providing information including the anonymous endorsement 122 and the transaction 120 to a second organization 104 associated with the blockchain 106 (e.g., by writing the transaction 120 to the blockchain 106). In some embodiments, the anonymous endorsement 122 is anonymous to peers 128 associated with the second organization 104. In other words, the peers 128 of the second organization 104 cannot identify the endorsing entity of the anonymous endorsement 122 because they do not have access to keys associated with the first organization.

In view of the figures and discussion, an example instantiation of a lifecycle of a transaction is provided. First, state-based endorsement can be used to associate a ledger key (e.g., "key") in a local collection (e.g., "local") with an ephemeral key that is re-randomized by a first organization's key. Second, a transacting client can contact a first peer of the first organization for endorsement. The first peer can issue a command referencing the ledger key and the local collection (e.g., a PutPrivateData("Local", "key", data)) and data can be stored in a transient store of the first peer. The transaction can then be endorsed using the re-randomized key. Third, as the transaction commits, a second peer of the first organization can detect that the first peer endorsed the transaction by inspecting the endorsement and detecting the HMAC tag. In response, the second peer can retrieve the preimage from the first peer. Fourth, data can thus be made available to all peers of the first organization that endorsed the transaction without requiring that all peers endorsed the transaction.

Figure 3A:
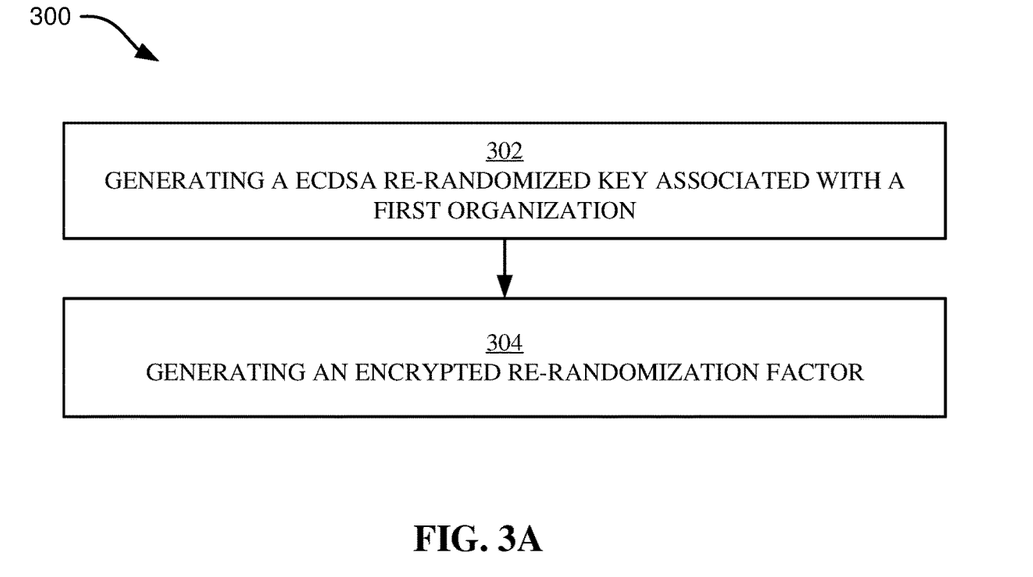
FIG. 3A illustrates a flowchart of an example method for generating an ephemeral key, in accordance with some embodiments of the present disclosure.

FIG. 3A illustrates a flowchart of an example method 300 for generating an ephemeral key 116, in accordance with some embodiments of the present disclosure. In some embodiments, the method 300 is implemented by a server, a computer, a processor, a virtual machine, one or more peers 108, or another configuration of hardware and/or software. In some embodiments, the method 300 is a sub-method of operation 202 of FIG. 2.

Operation 302 includes generating an ephemeral key 116 that is an ECDSA re-randomized key based on a ledger key associated with a first organization 102. Operation 304 includes generating an encrypted re-randomization factor 118. In some embodiments, the re-randomization factor is encrypted using a public key 112 associated with the first organization 102.

Figure 3B:
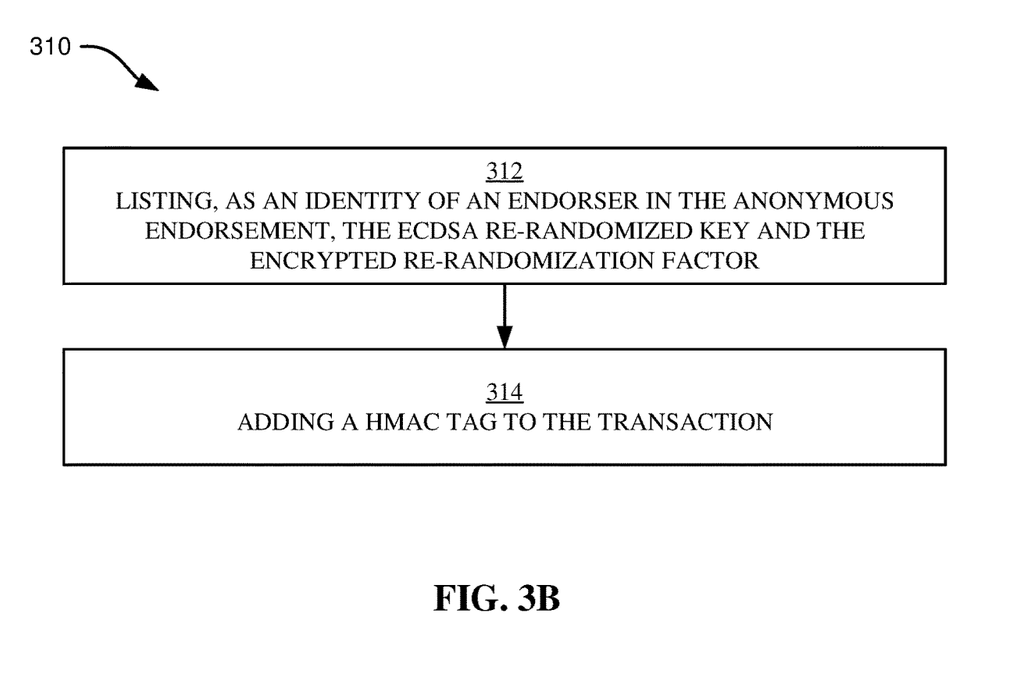
FIG. 3B illustrates a flowchart of an example method for generating an anonymous endorsement, in accordance with some embodiments of the present disclosure.

FIG. 3B illustrates a flowchart of an example method 310 for generating an anonymous endorsement 122, in accordance with some embodiments of the present disclosure. In some embodiments, the method 310 is implemented by a server, a computer, a processor, a virtual machine, one or more peers 108, or another configuration of hardware and/or software. In some embodiments, the method 310 is a sub-method of operation 204 of FIG. 2.

Operation 312 includes listing, as an identity of an endorser in the anonymous endorsement 122, the ephemeral key 116. In some embodiments, the ephemeral key 116 is a ECDSA re-randomized key. In such embodiments, the anonymous endorsement 122 further lists the encrypted re-randomization factor 118. Operation 314 includes adding an HMAC tag 124 to the transaction 120 as part of the anonymous endorsement 122. In some embodiments, the HMAC tag 124 is derived from a private key 114 associated with the first organization 102.

Figure 4:
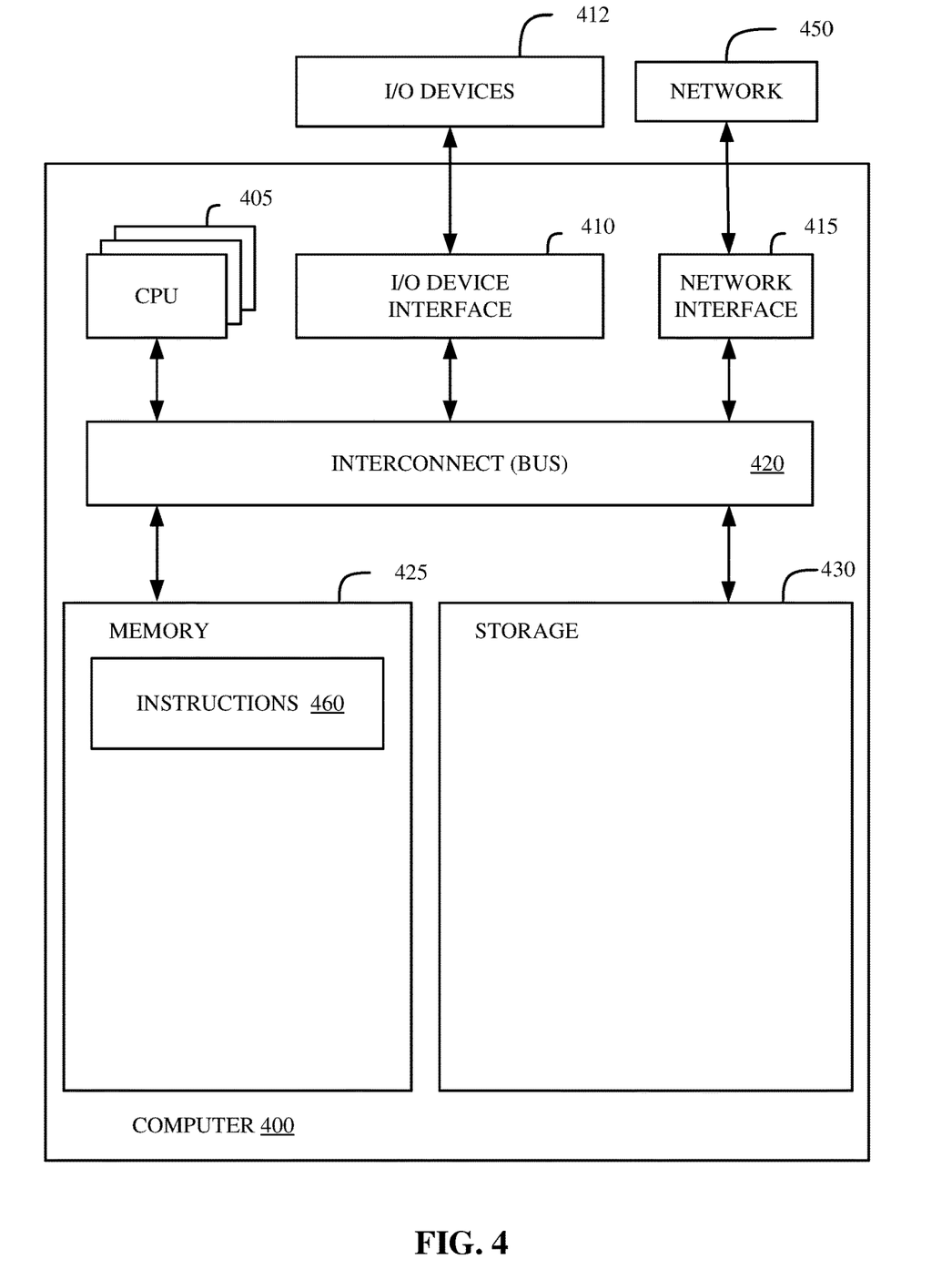
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all portions of the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) one or more entities of the computational environment 100 of FIG. 1 (e.g., first organization 102, second organization 104, peers 108, peers 128, and/or blockchain 106) and/or other aspects of the present disclosure.

Computer 400 includes memory 425, storage 430, interconnect 420 (e.g., a bus), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more buses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random-access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the methods of FIGS. 2-3 and/or implementing the functionality discussed in any portion of FIG. 1. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
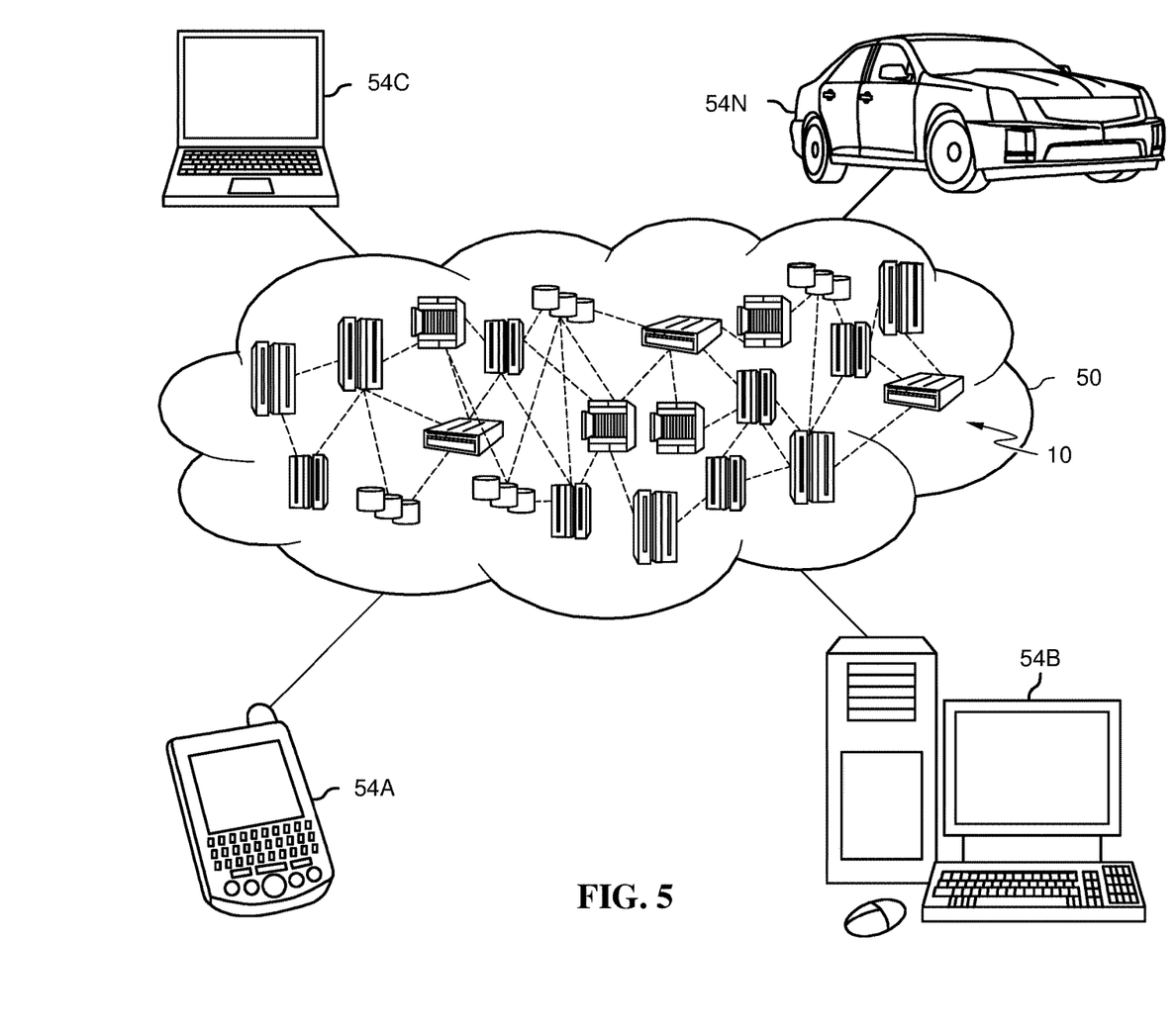
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
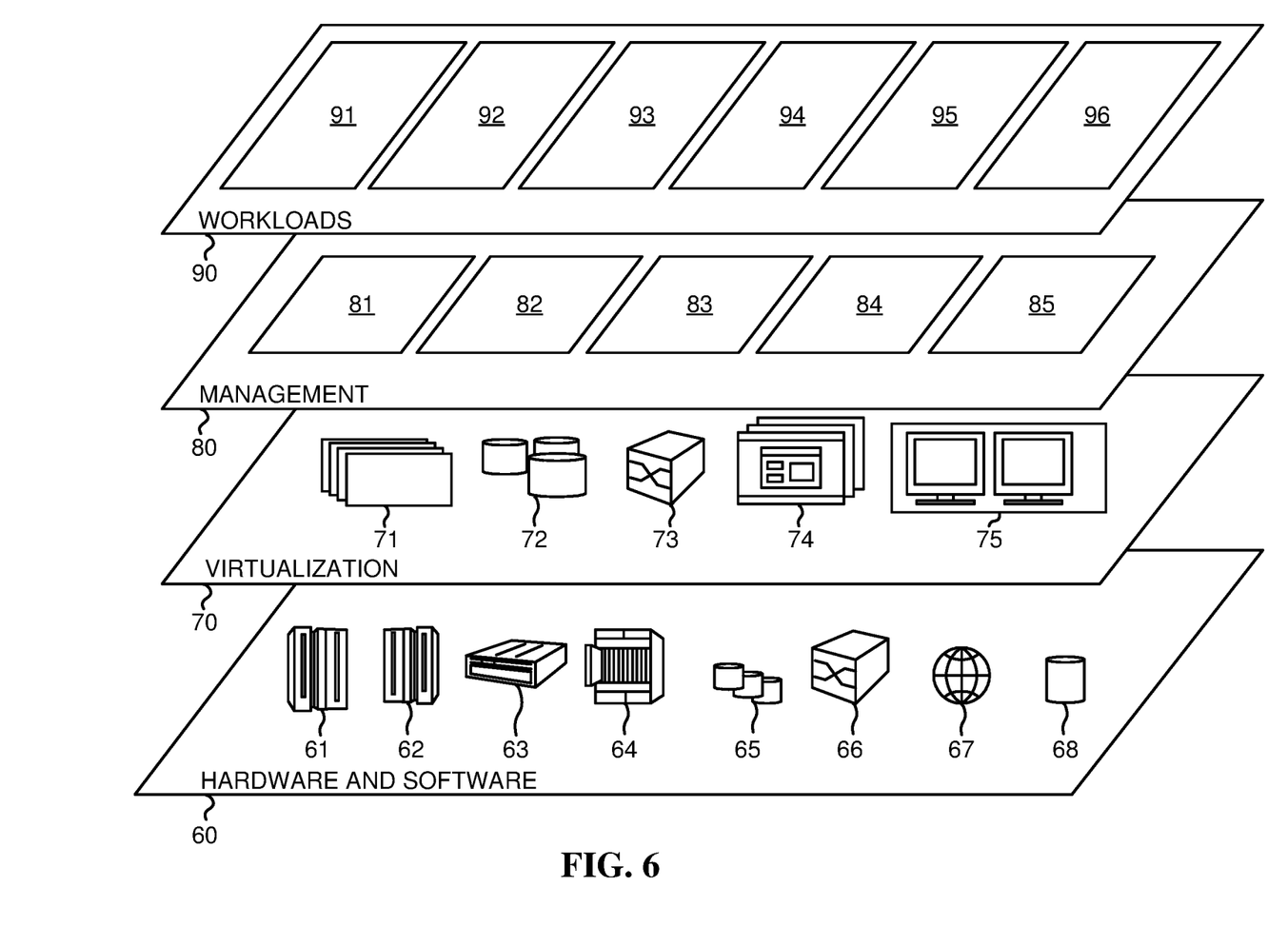
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and privacy-preserving endorsements in blockchain transactions 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the methods described with respect to FIGS. 2-3 and/or implement any portion of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes associating a ledger key in a local collection with an ephemeral key, wherein the ephemeral key is a re-randomization of a key associated with a first organization; generating, by a first peer associated with the first organization, an anonymous endorsement of a transaction in a blockchain using the ephemeral key; determining, by a second peer associated with the first organization, that the first peer endorsed the transaction; retrieving, by the second peer, a preimage from the first peer; and providing information including the anonymous endorsement and the transaction to a second organization associated with the blockchain, wherein the anonymous endorsement is anonymous to peers associated with the second organization.

Example 2 includes the method of example 1, including or excluding optional features. In this example, the ephemeral key is an Elliptical Curve Digital Signature Algorithm (ECDSA) re-randomized key. Optionally, a re-randomization factor associated with the ECDSA re-randomized key is encrypted using a public key of the first organization to generate an encrypted re-randomization factor. Optionally, endorsing the transaction further comprises listing, as an identity of an endorser, the re-randomized ECDSA key and the encrypted re-randomization factor.

Example 3 includes the method of any one of examples 1 to 2, including or excluding optional features. In this example, the local collection is a built-in collection definition with a distribution policy determined at runtime based on possession of a preimage.

Example 4 includes the method of any one of examples 1 to 3, including or excluding optional features. In this example, endorsing the transaction further comprises adding, by the first peer, a Hash-based Message Authentication Code (HMAC) tag to the transaction. Optionally, the HMAC tag is based on the ephemeral key. Optionally, determining, by the second peer, that the first peer endorsed the transaction includes detecting the HMAC tag in the anonymous endorsement.

Example 5 includes the method of any one of examples 1 to 4, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 6 is a system. The system includes one or more processors and one or more computer-readable storage media storing program instructions which, when executed by the one or more processors, are configured to cause the one or more processors to perform a method according to any one of examples 1 to 5.

Example 7 is a computer program product. The computer program product includes one or more computer readable storage media, and program instructions collectively stored on the one or more computer readable storage media, the program instructions comprising instructions configured to cause one or more processors to perform a method according to any one of examples 1 to 5.

What is claimed is:

1. A computer-implemented method comprising:
   associating a ledger key in a local collection with an ephemeral key, wherein the ephemeral key is a re-randomization of a key associated with a first organization;
   generating, by a first peer associated with the first organization, an anonymous endorsement of a transaction in a blockchain using the ephemeral key;
   determining, by a second peer associated with the first organization, that the first peer endorsed the transaction;
   retrieving, by the second peer, a preimage from the first peer; and providing information including the anonymous endorsement and the transaction to a second organization associated with the blockchain, wherein the anonymous endorsement is anonymous to peers associated with the second organization.

2. The method of claim 1, wherein the ephemeral key is an Elliptical Curve Digital Signature Algorithm (ECDSA) re-randomized key.

3. The method of claim 2, wherein a re-randomization factor associated with the ECDSA re-randomized key is encrypted using a public key of the first organization to generate an encrypted re-randomization factor.

4. The method of claim 3, wherein endorsing the transaction further comprises listing, as an identity of an endorser, the re-randomized ECDSA key and the encrypted re-randomization factor.

5. The method of claim 1, wherein the local collection is a built-in collection definition with a distribution policy determined at runtime based on possession of a preimage.

6. The method of claim 1, wherein endorsing the transaction further comprises adding, by the first peer, a Hash-based Message Authentication Code (HMAC) tag to the transaction.

7. The method of claim 6, wherein the HMAC tag is based on the ephemeral key.

8. The method of claim 6, wherein determining, by the second peer, that the first peer endorsed the transaction includes detecting the HMAC tag in the anonymous endorsement.

9. The method of claim 1, wherein the method is performed by one or more computers according to software that is downloaded to the one or more computers from a remote data processing system.

10. The method of claim 9, wherein the method further comprises:
    metering a usage of the software; and
    generating an invoice based on metering the usage.

11. A system comprising:
    one or more processors; and
    one or more computer-readable storage media storing program instructions which, when executed by the one or more processors, are configured to cause the one or more processors to perform a method comprising:
    associating a ledger key in a local collection with an ephemeral key, wherein the ephemeral key is a re-randomization of a key associated with a first organization;
    generating, by a first peer associated with the first organization, an anonymous endorsement of a transaction in a blockchain using the ephemeral key;
    determining, by a second peer associated with the first organization, that the first peer endorsed the transaction;
    retrieving, by the second peer, a preimage from the first peer; and
    providing information including the anonymous endorsement and the transaction to a second organization associated with the blockchain, wherein the anonymous endorsement is anonymous to peers associated with the second organization.

12. The system of claim 11, wherein the ephemeral key is an Elliptical Curve Digital Signature Algorithm (ECDSA) re-randomized key.

13. The system of claim 12, wherein a re-randomization factor associated with the ECDSA re-randomized key is encrypted using a public key of the first organization to generate an encrypted re-randomization factor, and wherein endorsing the transaction further comprises:
    listing, as an identity of an endorser, the re-randomized ECDSA key and the encrypted re-randomization factor.

14. The system of claim 11, wherein endorsing the transaction further comprises adding, by the first peer, a Hash-based Message Authentication Code (HMAC) tag to the transaction.

15. The system of claim 14, wherein determining, by the second peer, that the first peer endorsed the transaction includes detecting the HMAC tag in the anonymous endorsement.

16. A computer program product comprising one or more computer readable storage media, and program instructions collectively stored on the one or more computer readable storage media, the program instructions comprising instructions configured to cause one or more processors to perform a method comprising:
    associating a ledger key in a local collection with an ephemeral key, wherein the ephemeral key is a re-randomization of a key associated with a first organization;
    generating, by a first peer associated with the first organization, an anonymous endorsement of a transaction in a blockchain using the ephemeral key;
    determining, by a second peer associated with the first organization, that the first peer endorsed the transaction;
    retrieving, by the second peer, a preimage from the first peer; and
    providing information including the anonymous endorsement and the transaction to a second organization associated with the blockchain, wherein the anonymous endorsement is anonymous to peers associated with the second organization.

17. The computer program product of claim 16, wherein the ephemeral key is an Elliptical Curve Digital Signature Algorithm (ECDSA) re-randomized key.

18. The computer program product of claim 17, wherein a re-randomization factor associated with the ECDSA re-randomized key is encrypted using a public key of the first organization to generate an encrypted re-randomization factor, and wherein endorsing the transaction further comprises:
    listing, as an identity of an endorser, the re-randomized ECDSA key and the encrypted re-randomization factor.

19. The computer program product of claim 16, wherein endorsing the transaction further comprises adding, by the first peer, a Hash-based Message Authentication Code (HMAC) tag to the transaction.

20. The computer program product of claim 19, wherein determining, by the second peer, that the first peer endorsed the transaction includes detecting the HMAC tag in the anonymous endorsement.

* * * * *